United States Patent Office 3,277,720
Patented Oct. 11, 1966

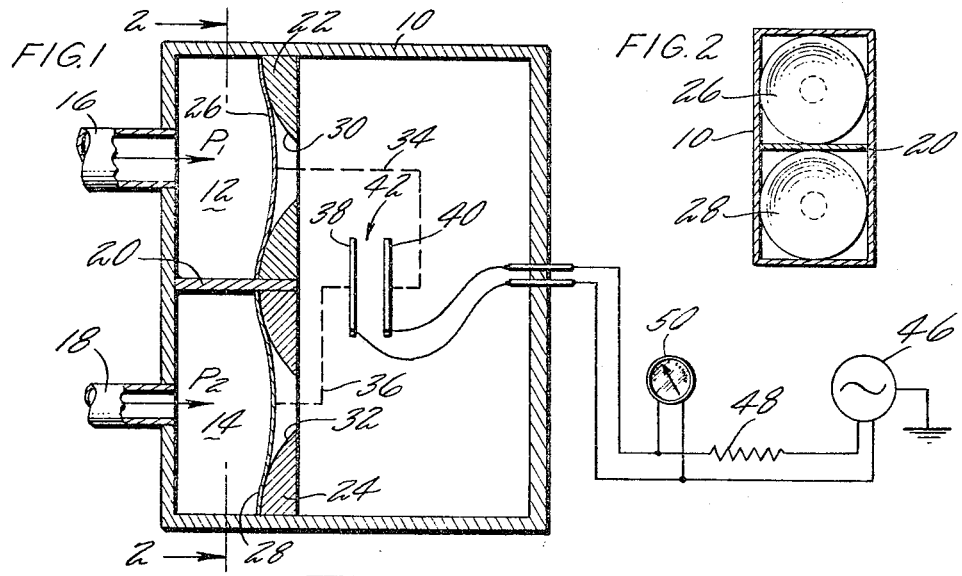
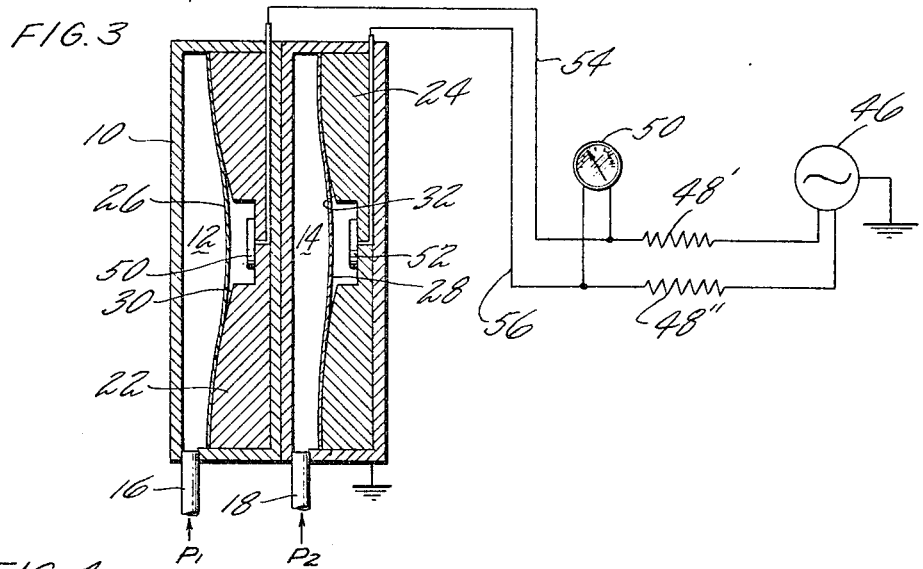
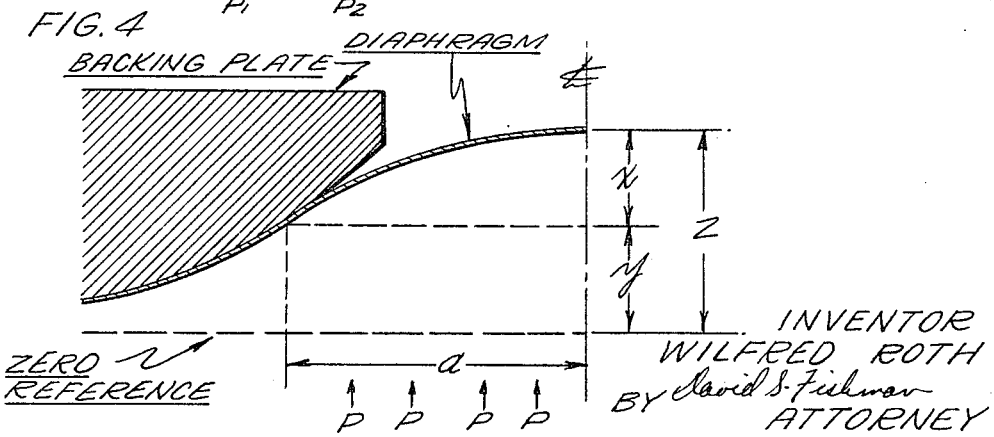

3,277,720
PRESSURE SENSOR
Wilfred Roth, West Hartford, Conn., assignor to United
 Aircraft Corporation, East Hartford, Conn., a corpora-
 tion of Delaware
Filed Dec. 3, 1963, Ser. No. 327,655
7 Claims. (Cl. 73—407)

This invention relates to a sensing or measuring device. More particularly, this invention relates to a sensing or measuring device designed to generate a signal of a pre-determined function of a sensed condition or plurality of conditions, and this invention is particularly suitable for pressure ratio measurements.

Since this invention finds special application as a pressure ratio sensor, it will be described in that embodiment. However, it will be specifically understood that this invention has wide application as a general condition sensor in which it is desirable to generate a signal having a pre-determined functional relationship with the condition being sensed.

An instrument to measure the ratio of two pressures is a primary sensor useful in performing many control functions, such as, for example, in high speed aircraft environments. Although pressure ratio devices are presently available, the range and accuracy are not adequate to satisfy existing needs and these present devices are sensitive to temperature and acceleration forces. The instrument of the present invention is a compact and highly accurate measuring instrument which overcomes many of the problems present in the known devices.

In the present invention, a pair of diaphragms are exposed to the pressures whose ratio is to be measured. The diaphragms are supported on backing plates, and the backing plates are contoured so that the unsupported area of each diaphragm, i.e., the active or effective area of each diaphragm, is varied as the pressure on the diaphragm varies. As the pressure level or amplitude on each diaphragm increases so that the diaphragm is deflected toward the contoured support, more of the diaphragm comes into contact with the supporting member and hence the rigidity or stiffness of the diaphragm increases. As a result, the amount of deflection at the center of the diaphragm for a given increase in pressure at increased pressure levels will be less than it would have been if the diameter of the diaphragm had remained constant. Conversely, a decrease in applied pressure results in an increased active diaphragm area and an increased movement away from the support member for a given decrease in applied pressure as the absolute level of the applied pressure decreases.

By appropriate contouring of the support member the relationship between the applied pressure or a change in applied pressure and the deflection at the center of the diaphragm or the change in deflection at the center of the diaphragm can be made to conform to many predetermined relationships. In the pressure ratio sensing instrument it is particularly advantageous to make this relationship a logarithmic one so that the deflection of each diaphragm can be considered to be an output signal commensurate with the logarithm of the applied pressure, and the difference between the positions of the two diaphragms will then be commensurate with the ratio of the applied pressures. A highly desirable feature is that a ratio can be obtained directly through the simpler process of subtraction, and range of the ratio instrument is significantly increased since output is logarithmic rather than linear with pressure. Variable capacitor readout techniques or other techniques can then be used to measure the relative positions of the diaphragms to provide a meter reading of pressure ratio.

It will be understood that the pressure ratio measuring embodiment of the present invention has merely been chosen as the preferred and convenient embodiment for illustration of the concepts of the invention. However, many modifications are within the scope of the invention. By way of example, but not by way of limitation, the supporting elements could be contoured to provide many desired relationships between applied pressure and diaphragm deflection such as a binomial relationship, or a factorial relationship, etc. Also, a single diaphragm could be used to sense a condition of only one fluid rather than two diaphragms being used to sense conditions of two fluids, and the supporting member of the single diaphragm could be contoured to provide an output from the diaphragm commensurate with a desired function of the sensed condition of the one fluid. Additionally, the sensed condition in any embodiment need not be pressure, but could be any other condition, such as temperature, which could cause deflection or expansion and contraction of a diaphragm.

Accordingly, one object of the present invention is to provide a novel sensing system which is compact, reliable, and accurate.

Another object of the present invention is to provide a novel condition sensing system which generates an output signal commensurate with a desired function of the sensed condition.

Still another object of the present invention is to provide a novel condition sensing system in which a desired function of the sensed condition is generated through the use of a variable support for the sensing element.

Still another object of the present invention is to provide a novel pressure ratio sensing system which can be utilized over a wide range of pressures.

Other objects and advantages will be apparent from the specification and claims, and from the accompanying drawings which illustrate an embodiment of the invention.

FIG. 1 is a schematic representation of one embodiment of the sensing system of the present invention.

FIG. 2 is a sectional view along line 2—2 of FIG. 1 on a reduced scale.

FIG. 3 is a schematic representation of another embodiment of the sensing system of the present invention.

FIG. 4 is a model of the contoured diaphragm support of FIGS. 1 and 3.

Referring now to FIG. 1, a generalized configuration of the condition sensor of the present invention is shown. A casing 10 has two fluid chambers 12 and 14 therein each of which communicates with an unshown source of fluid through conduits 16 and 18, respectively. The chambers 12 and 14 are separated by a partition 20, and the chambers 12 and 14 are of square cross section (see FIG. 2). Annular backplate or support members 22 and 24 are fitted within chambers 12 and 14, respectively. The dimensions of the peripheries of the backplates match the inner dimensions of the chambers, and the backplates are joined to the walls of the chambers in any suitable fashion. Diaphragms 26 and 28 of circular cross section (see also FIG. 2) are joined at their outer edges to backplates 22 and 24, respectively.

If flexible diaphragms 26 and 28 were allowed to operate in their linear ranges, each would have a displacement at its center proportional to the applied pressure $P_1$ and $P_2$ in the chambers 12 and 14, respectively. However, for a given applied pressure, the deflection at the center of a diaphragm is proportional to the fourth power of the diameter, and hence the deflection at the center of a diaphragm can be made to vary in accordance with a desired function by varying the effective diameter or effective area of the diaphragm. The variation in the diameter and the effective area of diaphragms 26 and 28 is achieved by contouring the surfaces 30 and 32 of backing plates 22 and 24 so that the contact between the diaphragms and their backing plates varies as the applied pressure varies. An increase in applied pressure will cause a diaphragm to be pressed against its backing plate so that the unsupported diameter and hence the effective area of the diaphragm will decrease as applied pressure increases. A diaphragm characteristic will change in that the diaphragm will become stiffer and the deflection at the center for a given applied pressure will be less than it would have been if the diameter had remained constant. The displacement at the center of the diaphragm can be made to have a logarithmic relationship to the applied pressure by appropriately contouring the backing plate.

In the embodiment shown in FIG. 1, backing plates 22 and 24 are contoured to provide the desired logarithmic relationship between the pressure applied to each diaphragm and the displacement of the center of each diaphragm. Mechanical linkages 34 and 36 connect the center of each diaphragm to the movable plates 38 and 40 of a variable capacitor 42. The position of link 34 and the position of movable capacitor plate 40 can both be considered to be output signals from diaphragm 26 commensurate with the logarithmic function of the pressure condition in chamber 12, and the positions of linkage 36 and variable capacitor plate 38 can likewise be considered to be output signals from diaphragm 28 commensurate with a logarithmic function of the pressure in chamber 14.

The instantaneous value of the capacitance of capacitor 42 can be made to be commensurate with the ratio of the pressure $P_1$ in chamber 12 to the ratio of the pressure $P_2$ in chamber 14 by constructing linkages 34 and 36 so that the plates 38 and 40 move to increase the distance therebetween as $P_1$ increases with respect to $P_2$ and move to decrease the distance therebetween as $P_2$ increases with respect to $P_1$.

Capacitor 42 forms part of a measuring or sensing circuit in which A.C. constant voltage source 46 supplies a resistor 48 to form a constant current source for capacitor 42. Resistor 48 is of very high impedance compared to the impedance of capacitor 42 to achieve the necessary constant current A.C. source for the circuit. A voltmeter 50 is connected to read the voltage drop across capacitor 42, and the face of meter 50 is calibrated with a logarithmic scale to read directly the ratio $P_1/P_2$. Since the separation between plates 38 and 40 is equal to the difference between the deflections at the centers of diaphragms 26 and 28, and since the deflection at the center of each diaphragm varies as the logarithm of the applied pressure, the spacing between plates 38 and 40 is proportional to log $P_1$—log $P_2$ or log $(P_1/P_2)$. Therefore, the capacity of capacitor 42 is expressed by the relationship $$C = \frac{KA}{d}$$

where K is a constant based on the dielectric constant of the material between the plates and the permittivity of free space, A is the area of the plate, and $d$ is the distance between the plates. However, since the distance between the plates is proportional to log $(P_1/P_2)$, and since the area of the plates is constant for any embodiment, the capacity of capacitor 42 can be written $C=B$ log $(P_2/P_1)$ where B is a constant. The voltage across capacitor 42 is given by $$V = \frac{I}{j\omega C}$$

and hence $V=B'$ log $(P_1/P_2)$ where B' is a constant involving $I/j\omega$.

Hence, the voltage across capacitor 42 at any given time is proportional to the log of $P_1/P_2$, and the ratio $P_1/P_2$ can be read directly on the logarithmic scale on meter 50.

Proper contouring of the surfaces 30 and 32 of the backing plates is necessary in order to obtain the desired functions to position the capacitor plates. FIG. 4 shows a model of a contoured backing plate and a diaphragm and will be used to discuss the development of the contour of the backing plate. The FIG. 4 showing is part of a figure of revolution so that complete symmetry about the indicated center line is assumed. The axial displacement of the center of the diaphragm measured from the point at which the diaphragm last has contact with the backing plate is designated as $x$. The displacement of the backing plate at this same last point of contact from a reference of zero displacement is designated by $y$. The total displacement of the center of the diaphragm with respect to this same zero reference is $z$. It is the latter quantity $z$ that is to be proportional to the logarithm of the applied pressure which is shown as the pressure loading P in FIG. 4.

The desired response can be written as $$z = A \log P + z_0 \qquad (1)$$

where A is a constant of proportionality and $z_0$ is a design constant that physically equals the axial displacement of the diaphragm when the applied pressure equals unity. From FIG. 4 it can be seen that $$z = x + y \qquad (2)$$

For a simply supported diaphragm the general equation for axial displacement as a function of radius from the center is given by Love, "Mathematical Theory of Elasticity" (Dover, 4th edition, 1944), page 490.

$$x(r) = \frac{P}{64D}(a^2 - r^2)\left(\frac{5+\sigma}{1+\sigma}a^2 - r^2\right) \qquad (3)$$

where $$D = \frac{1}{12}\frac{Et^3}{(1-\sigma^2)}$$

P is the applied pressure, $a$ is the outer radius of the simply supported diaphragm, $r$ is the radial distance from the center, $\sigma$ is Poisson's constant, E is Young's modulus and $t$ is thickness of the diaphragm. The axial displacement of the diaphragm at its center is readily obtained from Equation 3 by letting $r$ equal zero. Thus, $$x(0) = \frac{Pa^4}{64D}\left(\frac{5+\sigma}{1+\sigma}\right) \qquad (4)$$

or $$x(0) = KPa^4 \qquad (4a)$$

where $$K = \frac{5+\sigma}{64D(1+\sigma)}$$

The problem is to determine the shape of the backing plate that is required to decrease the outer diameter of a simply supported diaphragm in a manner such that the total diaphragm displacement will generate the logarithmic pressure characteristic specified by Equation 1. The condition that must be imposed in order to satisfy the physical requirements of the problem is that the slopes of the backing plate and the diaphragm must be equal at the last point of contact between those two elements. This condition assures that the diaphragm is always simply supported rather than clamped and that Equation 3 truly represents the displacement curve of the diaphragm.

Differentiation of Equation 3 followed by substitution of $r=a$ gives $$\left(\frac{dx}{dr}\right)_{r=a} = -\frac{8K}{5+\sigma}Pa^3 \qquad (5)$$

The negative sign is indicative of the fact that the displacement of the diaphragm increases positively as the radius of the diaphragm decreases. In order to derive the proper curve for the backing plate, it is assumed that a pressure $P_1$ has been applied to the diaphragm, that the diaphragm separates from the backing plate at a point having a displacement $y_1$ with an outer radius of the diaphragm being $a_1$ and that the diaphragm itself has a displacement $x_1$ measured with respect to its support point on the backing plate. In accordance with Equations 1 and 2, it follows that this state of operation can be described by the relation $$x_1 + y_1 = A \log P_1 + z_0 \tag{6}$$

The problem is then to determine what change in the backing plate must be introduced in order that the total deflection along the central axis of the diaphragm will increase logarithmically for a small increment in applied pressure.

It follows from Equation 6 that increments of both sides must also produce an equality, or that $$\Delta x_1 + \Delta y_1 = A \Delta \log P_1 \tag{7}$$

$\Delta x_1$ can be obtained from Equation 4, but it is important to recall that both $P_1$ and $a_1$ are also variables. Thus, $$\Delta x_1 = K(P_1 + \Delta P_1)(a_1 - \Delta a_1)^4 - K P_1 a_1^4 \tag{8}$$

If small changes in pressure are considered, small increments in $a_1$ will result, and it is proper to neglect products of the increments. Furthermore, under these same conditions, it is also appropriate to expand the fourth power term in the binomial series retaining only those terms up to and including the first order in the increment. With these approximations, Equation 8 can be expanded and simplified to arrive at the expression $$\Delta x_1 = K a_1^4 \Delta P_1 - 4 K a_1^3 P_1 \Delta a_1 \tag{9}$$

Recalling that a necessary condition is that the diaphragm and backing plate must be tangent at the point of departure, then from Equation 5 it can be seen that the increment in the displacement of the backing plate in terms of the increment in outer radius of the diaphragm can be written $$\Delta y_1 = \frac{8K}{5+\sigma} P_1 a_1^3 \Delta a_1 \tag{10}$$

The increment in the log pressure term becomes $$\Delta \log P_1 = \log (P_1 + \Delta P_1) - \log P_1 = \log\left(1 + \frac{\Delta P_1}{P_1}\right) \tag{11}$$

By substituting Equations 9, 10 and 11 in Equation 7, the following expression results $$\Delta a = \frac{K a_1^4 \Delta P_1 - A \log \left(1 + \frac{\Delta P_1}{P_1}\right)}{\left(4 - \frac{8}{5+\sigma}\right) K a_1^3 P_1} \tag{12}$$

This gives the change in $a_1$ required to produce the proper diaphragm deflection to achieve the logarithmic characteristic for an assumed change in pressure. Once the increment in $a_1$ is known, Equations 9 and 10 can then be employed to calculate the total displacement of the diaphragm. The problem then becomes one of calculating the values of these increments for various assumed values of pressure. By taking small increments of pressure, the backing plate curve can be derived by numerical integration.

The above-derived general theory can be employed in the following way. On the basis of rough calculations, the maximum allowable stress at the center of the diaphragm from minimum diameter and maximum applied pressure is utilized to determine the minimum thickness of the diaphragm, the specific material having been selected so that the proper elastic constants are also introduced. The maximum stress at the center is calculated from the equation for a simply supported diaphragm $$S = \frac{3}{8} \frac{P a^2}{t^2} (3+\sigma) \tag{13}$$

Once the material from which the diaphragm is to be constructed is selected and the maximum permissible stress limit is chosen on the basis of minimum allowable hysteresis, the constants D and K in the above equations can be evaluated. The minimum pressure and maximum radius are then selected and are designated $P_1$ and $a_1$, respectively. The axial coordinate of the backing plate measured with respect to some arbitrary reference under those conditions is designated $y_1$. A small increment of pressure is selected, making sure that $\Delta P_1/P_1$ is small (on the order of one-half percent or less). Substitution of these values into Equation 12 then provides the increment in $a_1$. The values of $a_1$, $P_1$, $\Delta a_1$ and $\Delta P_1$ are now available for substitution in Equations 9 and 10 whereby the increments in diaphragm deflection with respect to the simply supported edge and backing plate displacement that determines the new positions for supporting the edge are calculated.

By adding the various displacements to the assumed quantities for the initial position, the starting point for the second calculation is obtained. Thus, the quantities $a_2$, $P_2$, $y_2$, and $x_2$ are known. The process is then repeated to give values for the third position, etc. It may be necessary to take several hundred points in order to calculate the surface of the backing plate with the required degree of accuracy depending upon the range of pressures involved.

Reference will now be made to the configuration shown in FIG. 3 wherein parts which are structurally or functionally equivalent to parts in FIG. 1 are numbered as in FIG. 1. Although the system of FIG. 1 has the advantage of employing only one capacitor, the embodiment of FIG. 3 is the preferred embodiment. The FIG. 3 structure has two identical units nested into a rugged compact package that is essentially insensitive to temperature and acceleration changes since two identical pressure transducers are employed to produce a differential output.

The FIG. 3 embodiment employs two capacitors, plate 50 cooperating with metallic diaphragm 26 to form one capacitor, and plate 52 cooperating with metallic diaphragm 28 to form the other capacitor. The diaphragm of each unit is in electrical contact with casing 10 which is grounded; thus, one plate of each of the two capacitors is grounded. A.C. voltage source 46 is connected through resistor 48' to plate 50 via insulated conductor 54 which preferably runs along a groove on the bottom of backplate 22 and then through the center of backplate 50. A.C. voltage source 46 is similarly connected through resistor 48" and conductor 56 to plate 52. As in the FIG. 1 embodiment, resistors 48' and 48" are of equal value and of very high impedance compared to the impedance of the capacitors to which they are connected, and these high impedance resistors coact with constant voltage source 46 to provide the necessary constant current A.C. supply for the circuits.

The space between the electrodes of each capacitor in FIG. 3 is evacuated, and the electrode spacing of each capacitor is proportional to the log of the respective pressures in each of the chambers 12 and 14. Since each capacitor is driven with the same constant current, the voltage difference between the capacitors is proportional to log $(P_1/P_2)$, and this output is read on meter 50 to directly indicate pressure ratio.

To show that the differences of the voltages across the capacitors does give the desired output, assume that the deflection $(z_1)$ at the center of electrode diaphragm 26 is given by $z_1 = A \log P_1 + z_0$, and the deflection $z_2$ at the center of the electrode diaphragm 28 is given by $$z_2 = A \log P_2 + z_0$$

The respective output voltages across the capacitors is then $V_1 = G z_1$ and $V_2 = G z_2$ where G is a constant depending upon the area of the capacitor plates, the magnitude and frequency of the driving currents, and the dielectric constant between the capacitive plates. Combining these voltage equations to obtain the voltage difference results in the expression $$V_1 - V_2 = G(z_1 - z_2) = GA \log\left(\frac{P_1}{P_2}\right)$$

which is the desired relationship.

Bearing in mind that the essential requirement of the capacitor leadout circuits in both FIG. 1 and FIG. 3 is an A.C. current source of constant frequency and constant maximum amplitude, it will be apparent that the voltage sources and high resistors could be replaced by any suitable A.C. current sources.

It will also be understood that the capacitor readout systems are merely by way of illustration; mechanical, hydraulic, pneumatic, or other readout systems could also be employed.

It is to be understood that the invention is not limited to the specific embodiment herein illustrated and described, but may be used in other ways without departure from its spirit as defined by the following claims.

I claim:
1. A condition responsive device including:
   first resilient means, said first resilient means being exposed to fluid and reacting in response to a condition of the fluid, said first resilient means having a reaction area exposed to said fluid;
   second resilient means, said second resilient means being exposed to fluid and reacting in response to a condition of the fluid, said second resilient means having a reaction area exposed to said fluid;
   first rigidity varying means for varying the rigidity of said first resilient means independent of said second resilient means and in response to the reaction of said first resilient means to changes in said condition of the fluid to which said first resilient means is exposed;
   second rigidity varying means for varying the rigidity of said second resilient means independent of said first resilient means and in response to the reaction of said second resilient means to changes in said condition of the fluid to which said second resilient means is exposed;
   each of said rigidity varying means including a fixed support for each of said first and second resilient means, each of said fixed supports being in contact with at least part of a resilient means, said fixed supports having predetermined contours commensurate with a desired relationship between the reaction of each resilient means and said condition of the fluid to which each resilient means is exposed, and wherein reaction of each resilient means varies the contact between the resilient means and the fixed support therefor in accordance with changes in the condition of the fluid to which each of said resilient means is exposed to vary the rigidity of the resilient means in accordance with the contour of said support and independent of the reaction of the other of said resilient means; and
   means responsive to reactions of said first and second resilient means for generating an output signal commensurate with a predetermined mathematical relationship between the condition to which each of said resilient means is exposed, said relationship being a function of the contours of said supports.

2. A condition responsive device as in claim 1 wherein the contour of each of said supports defines a logarithmic relationship between the reaction of each resilient means and changes in said condition of the fluid to which each is exposed to generate a signal of the ratio between said conditions of the fluid to which each of said resilient means is exposed.

3. A condition responsive device as in claim 2 wherein the condition to which each resilient means is exposed is a fluid pressure, and wherein the generated signal is a signal of the ratio between the pressures to which each resilient means is exposed.

4. A condition responsive device including:
   a casing having first and second chambers;
   first diaphragm means in one of said chambers;
   second diaphragm means in the other of said chambers;
   means for delivering fluid to each of said chambers to expose a reaction surface of each of said first and second diaphragm means to the fluid in the respective chambers, each of said diaphragm means reacting to a condition of the fluid to which it is exposed;
   means for varying the reaction of each of said diaphragm means to said condition of the fluid in each chamber independent of the other of said diaphragm means in accordance with changes in said condition in each chamber;
   said reaction varying means for each diaphragm including a fixed support for each diaphragm on the side removed from the fluid in each chamber, each of said fixed supports being contoured in accordance with a desired relationship between said conditions of the fluid in each chamber and the reaction of the diaphragm in each chamber to said condition to vary the area of the reaction surface of each of said diaphragm means independent of the area of the reaction surface of the other of said diaphragm means; and
   means responsive to reactions of said first and second diaphragm means for generating an output signal commensurate with a predetermined mathematical relationship between the conditions of the fluids in said chambers, said relationship being a function of the contours of said supports.

5. A condition responsive device as in claim 4 wherein the contour of each of said supports defines a logarithmic relationship between the reaction of each diaphragm means and changes in said condition of the fluid to which each is exposed to generate a signal of the ratio between said conditions of the fluid to which each of said diaphragms is exposed.

6. A condition responsive device as in claim 5 wherein the condition to which each diaphragm is exposed is a fluid pressure, and wherein the generated signal is a signal of the ratio between the pressures to which each diaphragm is exposed.

7. A condition responsive device as in claim 5 wherein said output signal generating means includes capacitive means, said capacitive means being influenced by said first and second resilient means to vary in capacitance, and means for sensing an instantaneous condition of said capacitive means.

References Cited by the Examiner
UNITED STATES PATENTS

| 2,770,258 | 11/1956 | Bowditch | 73—407 X |
| 2,806,647 | 9/1957 | Touchman | 235—61 |
| 3,013,236 | 12/1961 | Bourns | 73—407 X |
| 3,138,027 | 6/1964 | Li | 73—406 X |
| 3,158,028 | 11/1964 | Chope | 73—398 |

FOREIGN PATENTS 217,134   1/1958   Australia.

LOUIS R. PRINCE, *Primary Examiner.*

DONALD O. WOODIEL, *Assistant Examiner.*